United States Patent
Kopko (10) Patent No.: US 6,234,036 B1
(45) Date of Patent: May 22, 2001

(54) ROLLER MECHANISM

(76) Inventor: William Leslie Kopko, 8705 Cromwell Dr., Springfield, VA (US) 22151

( * ) Notice: Subject to any disclaimer, the term of this patent is extended or adjusted under 35 U.S.C. 154(b) by 0 days.

(21) Appl. No.: 09/262,841

(22) Filed: Mar. 5, 1999

Related U.S. Application Data (60) Provisional application No. 60/077,008, filed on Mar. 6, 1998.

(51) Int. Cl.$^7$ ...................................................... F16H 27/02
(52) U.S. Cl. .......................... 74/89.22; 74/506; 242/388.6
(58) Field of Search .......................... 242/388.6; 74/89.2, 74/89.22, 506; 251/901

(56) References Cited

U.S. PATENT DOCUMENTS

| | | | |
|---|---|---|---|
| 1,759,572 | * 5/1930 | Hall .................................. | 242/388.6 |
| 4,291,630 | * 9/1981 | Fort .................................. | 104/173.1 |
| 4,440,354 | * 4/1984 | Kobayashi et al. ................ | 242/388.8 |
| 4,957,014 | * 9/1990 | Burke ................................ | 74/89.22 |
| 5,207,114 | * 5/1993 | Salisbury, Jr. et al. ........... | 74/479.01 |

* cited by examiner

*Primary Examiner*—John Fox (57) ABSTRACT

A roller mechanism that uses a differential spool arrangement to convert a small linear motion into a large rolling motion. The simplest embodiment comprises two spools that are rigidly connected together and are preferably of slightly different diameters. The flexible members such as string, tape, sheet, are rolled around the spools in opposite directions and extend from the spools in opposite directions. When tension is applied to the flexible members, a torque is created which acts to turn the spools so as to roll up the flexible member that is wrapped around the spool with the smaller diameter. The result is that a small movement of the flexible members results in large movement of the spools. Various embodiments of this mechanism are ideal for use in dampers, sunshades, toys, and exercise equipment.

19 Claims, 9 Drawing Sheets

ROLLER MECHANISM

The applicant claims benefit of U.S. provisional application Ser. No. 60/077,008 filed Mar. 6, 1998.

BACKGROUND OF THE INVENTION

An ancient mechanism called a "Chinese windlass" is an example of a device that achieves a mechanical advantage using spools of different diameters. This device can be used to a lift bucket of water from a well. It consists of a rope that is wound around two spools of slightly different diameters that share a common shaft. A pulley that is attached to a water bucket is located in the loop of rope between the two spools. The spools are wound in opposite directions so that rotating the shaft causes the rope to unwind from one spool as the other takes it up. If the spools were exactly the same diameter, turning the shaft would result in no change in the vertical position of the pulley since the rope unwound from one spool would exactly match that taken up by the other. However, because the spools have different diameters, the pulley will in fact move in response to the shaft rotation. The typical arrangement gives a large mechanical advantage, which means that a relatively small torque acting over a large number rotations can lift a large weight of water. The large mechanical advantage also means that friction of the bearings is sufficient to prevent backward rotation of the shaft from the weight of the bucket. A similar arrangement is used today in differential hoists such as those found in automotive repair shops.

The new mechanism turns the function of a Chinese windlass upside-down, in that it is designed to give a large rolling motion from a small linear motion. The new mechanism is ideal for use in a roller damper for controlling air flow. There are several different designs of dampers in the prior art. Problems with the existing designs include:
1) large force requirements
2) high cost
3) relatively small flow areas
4) high leakage rates
5) relatively long actuator movement required A more complete description of prior art appears in the current ASHRAE handbook.

Another excellent use of the mechanism is as a sun shade. Sun shades are normally manually operated. Various systems for automatically operating a sunshade are available, but they are clumsy and expensive.

The device can also be of great value in physical training. Existing training systems usually require massive and cumbersome weights to provide the proper force. Spring devices can be used, but they may not give the proper force characteristics. The new mechanism can give great flexibility in forces using relatively small weights or springs.

An additional use of the mechanism is as an amusement. Yo-yos and other toys have long been popular, but of limited variety. The new mechanism offers many possible alternatives for new toys or similar devices.

SUMMARY OF THE INVENTION

This invention involves a mechanism that converts between linear motion and a rolling motion. Specifically it uses a differential spool arrangement that allows for a small linear motion to create a large rolling motion that is suitable for damper and shading devices.

DETAILED DESCRIPTION OF THE INVENTION

Figure 1:
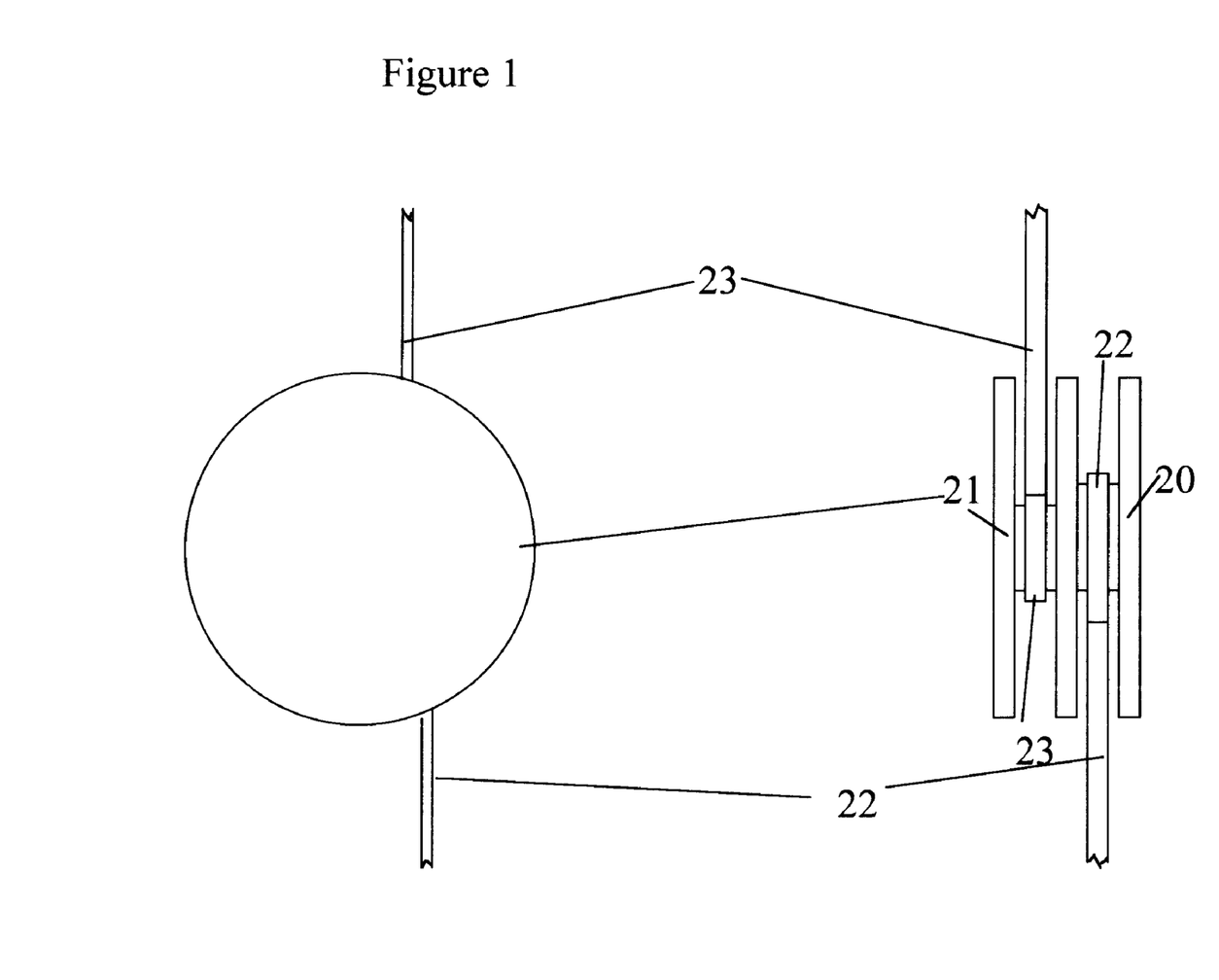
FIG. 1 is a basic embodiment of the invention.

FIG. 1 is a basic embodiment of the invention. A first spool 20 is rigidly attached to a second spool 21 and their axes are at least approximately the same. A first flexible member 22 is wrapped around the first spool 20. A second flexible member 23 is wrapped around the second spool 21 in the opposite direction from that of the first flexible member. The flexible members may be a sheet, tape, string, chain, belt, or similar form so that they can easily wrap around the spools. The diameters of the two spools are preferably slightly different. A tension force on the two flexible members will create forces on the spools that cause them to rotate and move toward the flexible member attached to the spool with the smaller diameter. Gravity can provide a return feature. While the preferred arrangement has spools of different diameters, spools of the same diameter can also work to some extent. In that case the weight of the spools will cause them to seek the lowest energy position in response to changes in the tension on the two flexible members.

Figure 2:
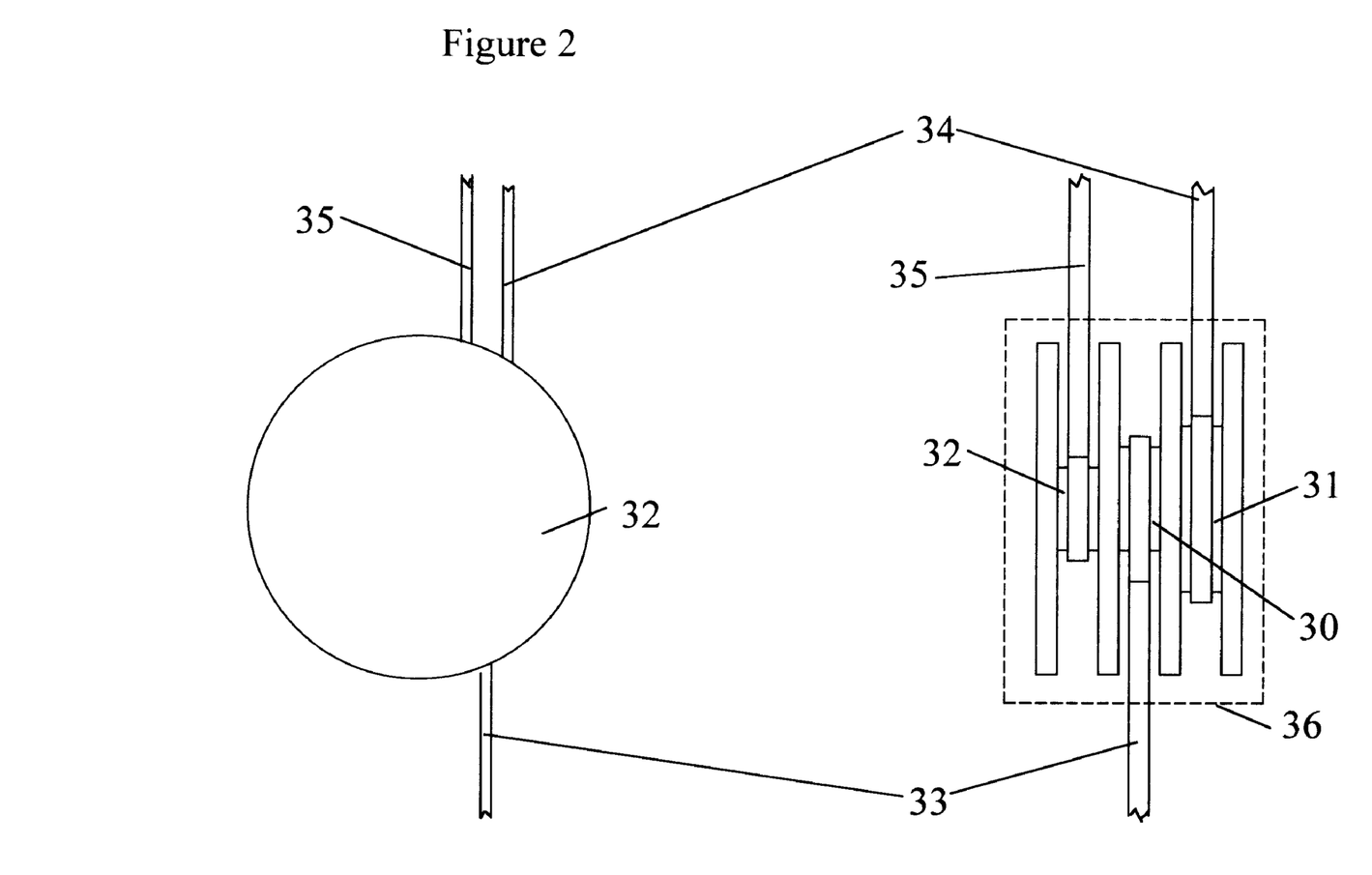
FIG. 2 is another basic embodiment of the invention.

FIG. 2 is a basic embodiment with three spools. A spool assembly 36 comprises a first spool 30 is rigidly attached to second spool 31 and third spool 32. The three spools all share a common axis. The first flexible member 33 is wrapped around first spool 30. Likewise the second flexible member 34 is wrapped around second spool 31 and third flexible member 35 is wrapped around third spool 32. The wrapping direction for the second and third spools is opposite that of the first. The diameter of the second spool is preferably larger than that of the first spool while that of the third spool is smaller. Tension applied to the second flexible member drives the spool assembly 36 so as to wind the first spool while tension on the third flexible member drives the spool assembly in the opposite direction.

These basic embodiments illustrate the principals of this invention. They also have practical applications as toys and physical training devices. The spool assembly can act as a shuttle that moves a large distance in response to a small movement of the flexible members. Indeed if the spools are not attached to the flexible members the device can be used to rapidly propel the spinning spools across a room or field. This arrangement can be used as a "Frisbee" thrower or similar toy.

This device allows a relatively small weight, spring, fan, or other means for restraining the motion of the spools to exert a relatively large force, which may be desirable in physical training. As will be described later variations in the spool geometry can vary the mechanical advantage to increase or decrease force requirements and control movement.

Figure 3:
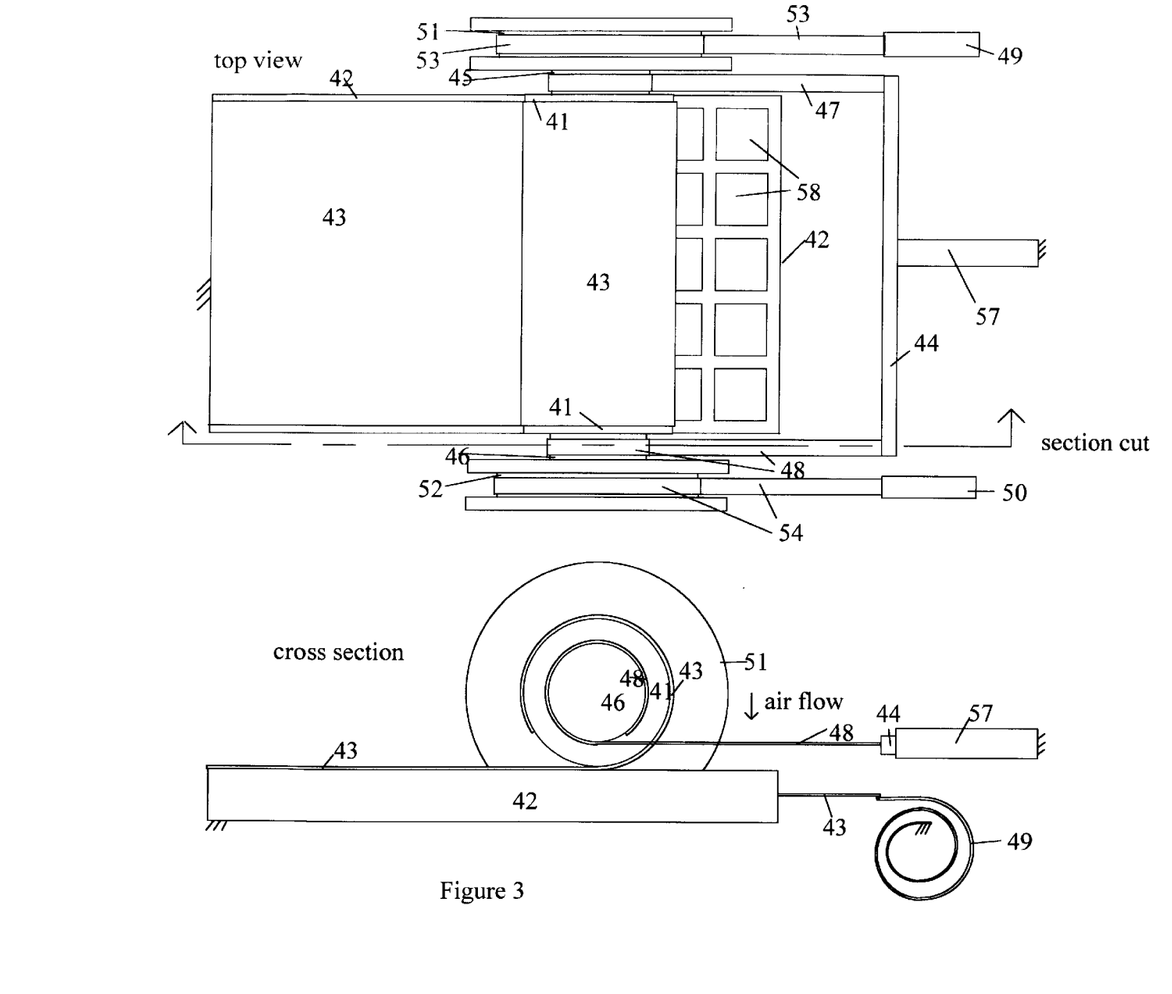
FIG. 3 is a basic damper embodiment.

FIG. 3 shows a top view and a cross-sectional view of a basic damper embodiment. Roller 41 rolls on rolling surface, 42. The rolling surface has flow channels, 58, which allow air to flow through it. Sheet 43 is attached at one end to the roller, and the other end is attached to the rolling surface at the far left. This sheet is wrapped clockwise around the roller so that as the roller moves to the right it unwraps the sheet and lays it down on the rolling surface. Smaller spools, 45 and 46, are rigidly attached to opposite ends of the roller and share a common axis with the roller. A first line, 47, is wrapped counterclockwise around small spool, 45, and a second line, 8, is likewise wrapped around second small spool, 46. One end of these lines is attached to the roller and the other end is attached to springs, 49 and 50, at the right. The springs are preferably identical and of the constant-force type. The springs should maintain a constant tension on lines 53 and 54. Large spools, 51 and 52, are also found at opposite ends of the roller. These spools have a diameter that is slightly larger than that of the roller. Like the smaller spools they are rigidly connected to the roller and share a common axis of rotation with the roller and the smaller spools. Third flexible line, 53, is wrapped counterclockwise around larger spool, 51, and a fourth flexible line, 54, is likewise wrapped around spool, 52. The third and fourth lines are attached at one end to the larger spools and at the other end to rod 44 which is connected to an actuator, 55. The actuator should exert a tension force when actuated.

The operation of this damper is quite simple. The when the actuator is not activated, the spring forces the roller to move to the left, which rolls up the sheet and allows air to flow through the rolling surface. When the actuator is activated, it increases the tension on lines 47 and 48 which causes the roller to move to the right. The damper is thus normally open. Reversing the locations of the actuator and the springs would reverse the action of the damper so that it would be normally closed.

The air flow through the rolling surface is preferably downward so that air pressure would tend to push the sheet against the surface. The sheet should have sufficient rigidity to resist the air pressure without slipping though the openings in the surface. On the other hand the sheet needs sufficient flexibility to be able to wrap around the roller without creating an excessive force on the spring or the actuator.

One limitation with this embodiment is that the rolling surface needs to be close to horizontal for the damper to work properly, since it is relying on gravity to hold the roller on the rolling surface.

Figure 4:
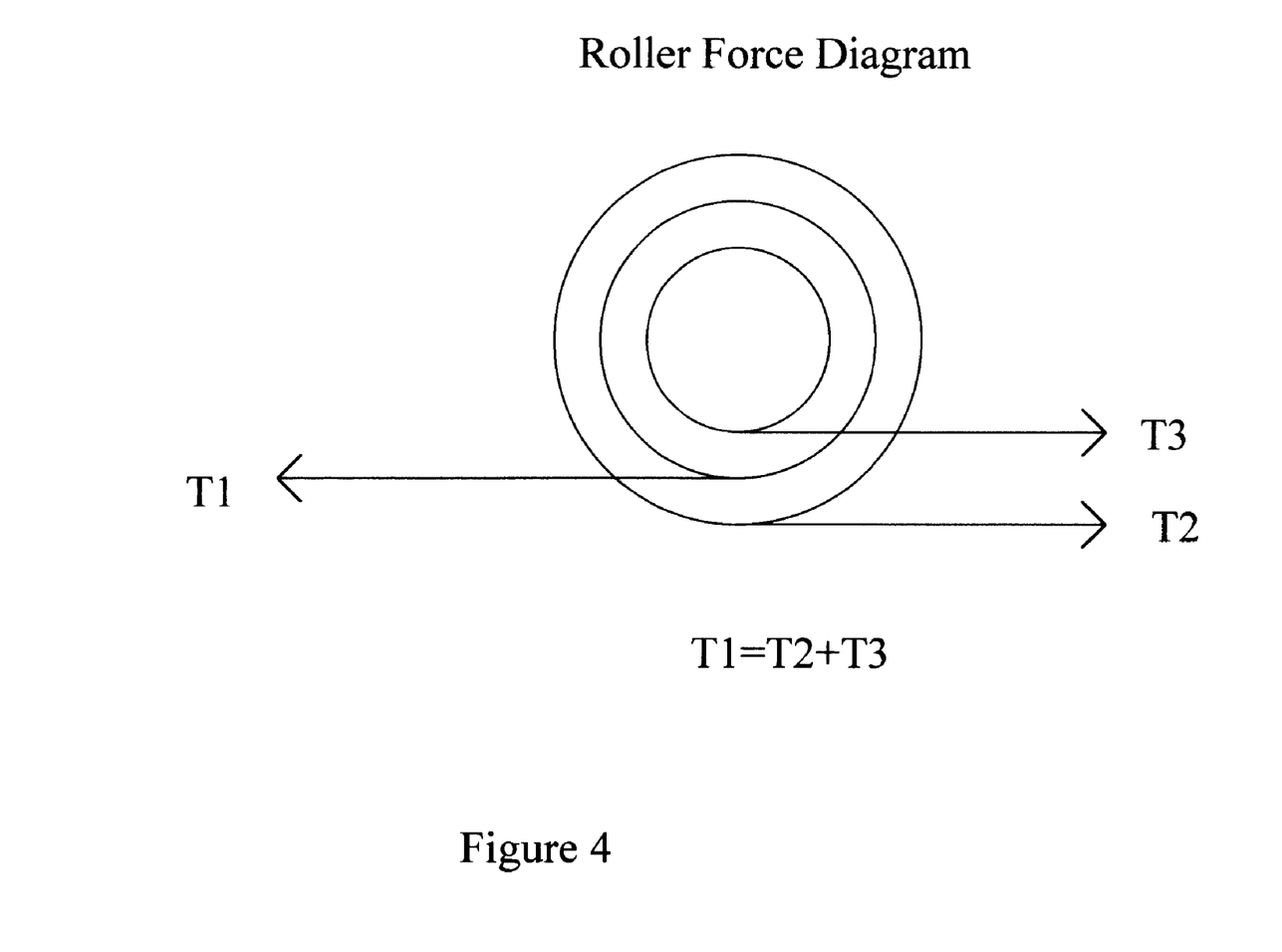
FIG. 4 is a force diagram for the embodiment in FIG. 1.

FIG. 4 is a force diagram for the roller assembly for FIG. 3. For equilibrium the net forces on the roller are zero which means $$T1=T2+T3$$

where:

T1 = the tension from the flexible sheet,

T2 = the tension on the lines wrapped around the larger spools, and

T3 = the tension from the lines wrapped around the smaller spools,

Another condition for equilibrium is that the moments acting on the roller must sum to zero. Using the point at the point of contact at the bottom of the roller to evaluate the moments gives the following equation at equilibrium:

$$T2(r1-r2)=T3(r-r3)$$

where:

r1 = the radius of the roller, r2 = the radius of the larger spool, r3 = the radius of the smaller spool.

If tension T3 is increased relative to T2, then the roller will move to the left and rolls up the flexible sheet. If T2 is increased relative to T3, then the roller moves to the right and unrolls the flexible sheet.

Figure 5:
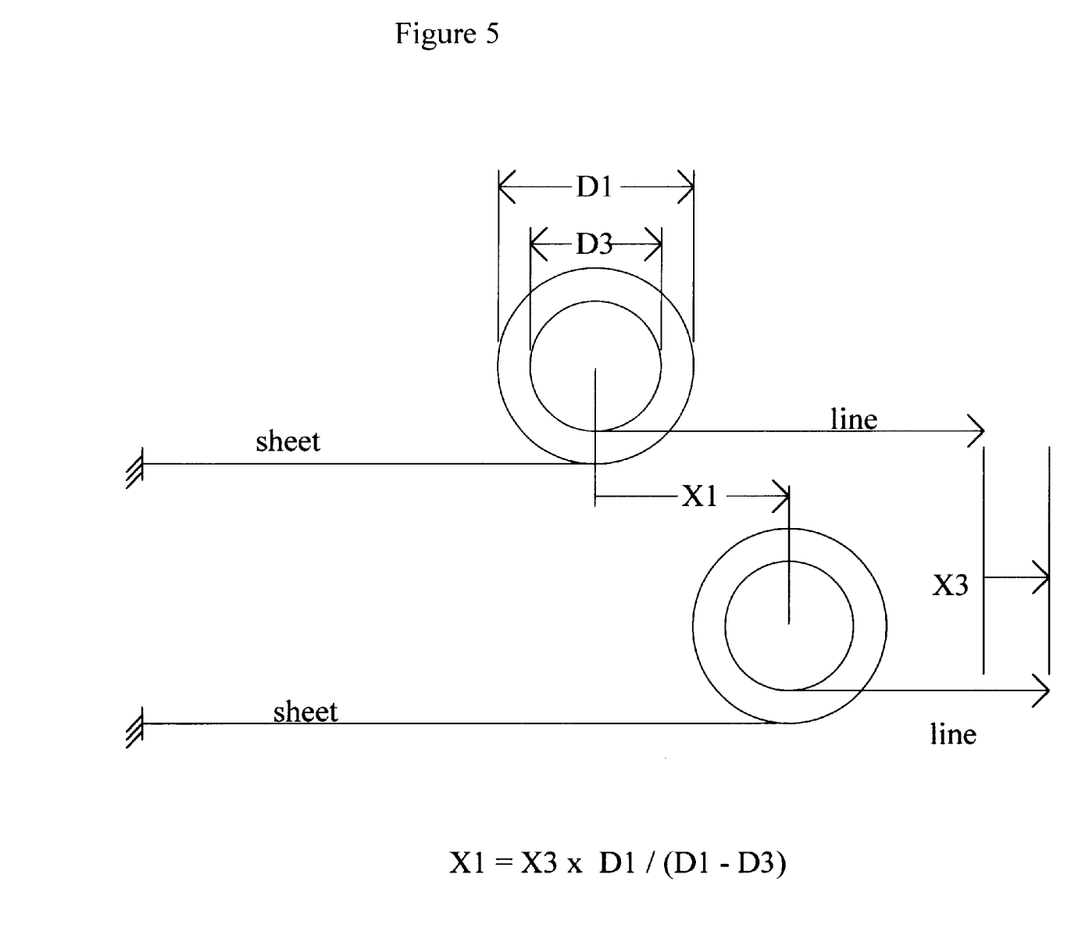
FIG. 5 shows how the invention amplifies the action of an actuator.

FIG. 5 shows how this simple mechanism acts to amplify the movement of an actuator. For the roller make one revolution in a clockwise direction, it will move a distance of $\pi D1$ to the right, where D1 is the diameter of the roller. At this same time it will roll up a length of line on the spool equal to $\pi D3$, where D3 is the diameter of the spool. The net movement X3 of the actuator is $\pi(D1-D3)$. The mechanical advantage is then:

$$X1/X3=D1/(D1-D3)$$

where:

X3 = the horizontal movement of the roller to the right and

X1 = the horizontal movement of the actuator to the right.

For the case where the roller is 10 cm in diameter and the spool diameter is 9 cm, the mechanical advantage is 10. Note that if the diameter of the roller were smaller than that of the spool, the roller would move in the opposite direction in response to the movement of the actuator.

Figure 6:
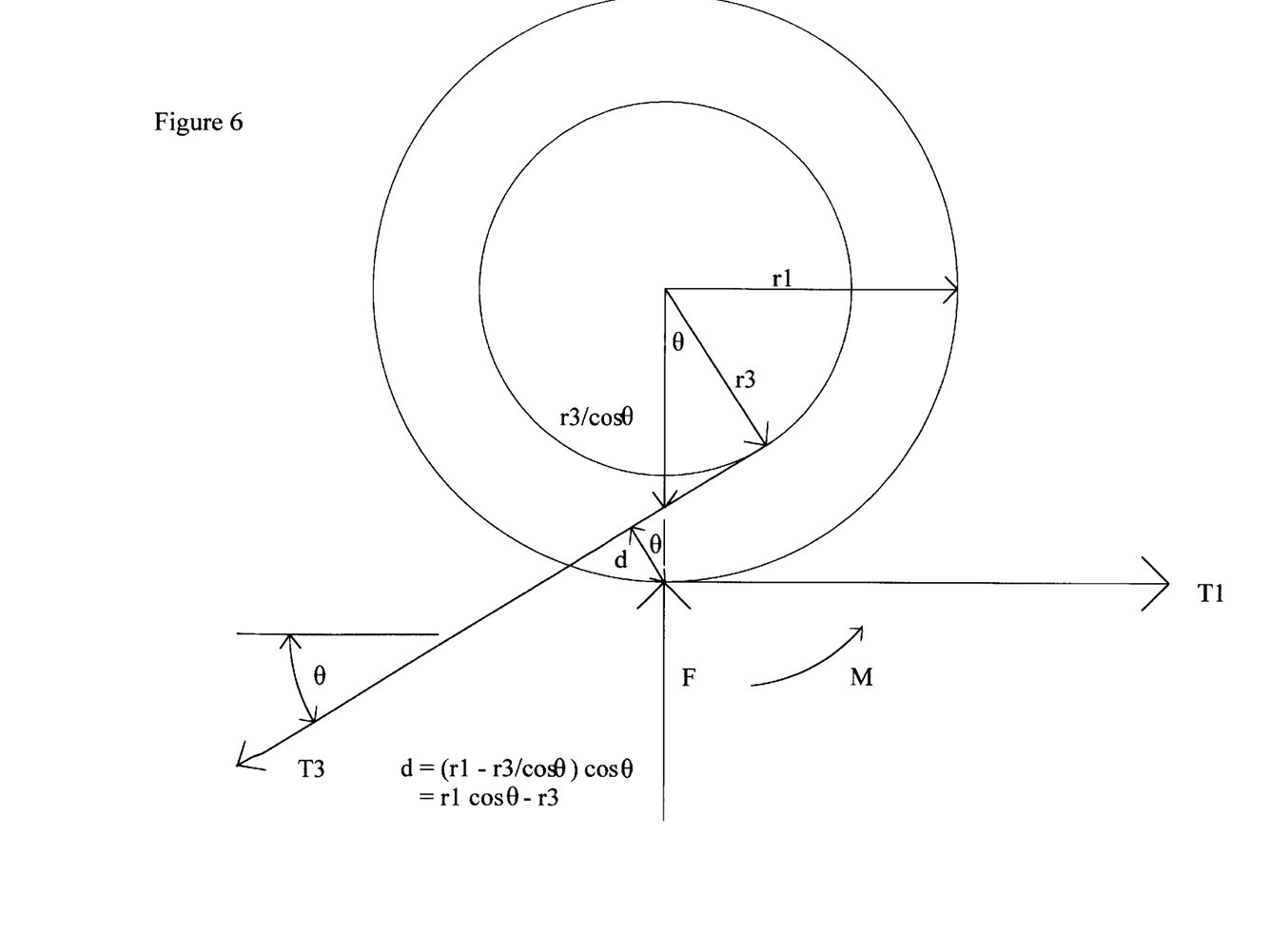
FIG. 6 is a more general force diagram for the invention.

FIG. 6 shows a more generalized analysis of forces on the roller when the lines are not parallel with the rolling surface. The moment about the point of contact between the roller and the rolling surface determines how the roller will move. The moment is the product of force times distance. In this case the moment is T1 times d, where d is the distance between the point of contact and the line. In terms of the geometry of the roller as shown in FIG. 6, $$M=T1(r3 \cos \theta - r1)$$

where

M = the moment acting on the roller and

θ = the angle between the line on the spool and the rolling surface.

This equation shows that if r1 cos θ is greater than r3 then the moment will tend to move the roller to the left. If r1 cos θ is less than r3 then the moment will tend to move the roller to the right. If the line from the spool goes through the point of tangency for the roller, then the tension on the spool has no effect on turning the roller.

While this analysis shows a rolling surface, it is also valid for cases where there is no rolling surface. The difference is that the normal force is zero, which means that the tension on the flexible members must support the weight of the roller.

The tension on the spool can also provide a force that keeps the roller in contact with the rolling surface. For the geometry shown in FIG. 8, the force acting to keep the roller in contact with the surface is T1 sin θ. This feature is important for orientations where the roller is not on top of a horizontal rolling surface.

A second issue with different orientations is maintaining good contact between the rolling surface and the flexible sheet. One solution is to use a flexible magnetic material for the sheet and use a material with a high magnetic permeability, such as steel, for the rolling surface. The attraction between the magnetic sheet and the rolling surface ensures a good seal. This feature can also allow the damper to stop flow in either direction, so long as the magnetic forces are sufficient to overcome the effect of air pressure.

A third consideration is that the angle of the line connected to the spool will vary as the roller moves. This change in angle also changes the moment on the roller for a given tension on the line.

Figure 7:
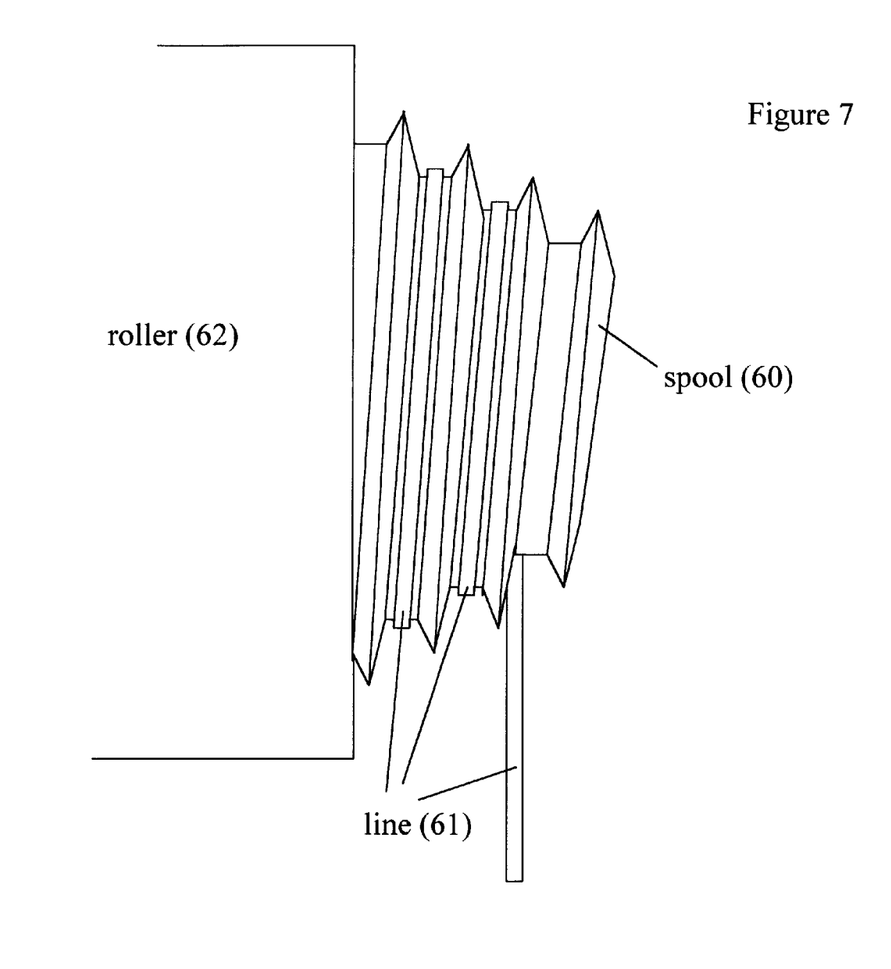
FIG. 7 shows a screw-type spool that can be used with this invention.

FIG. 7 shows a spool that solves this problem. Spool 60 has a screw geometry that allows the effective diameter to vary as the line 61 rolls up. The spool is attached to roller 62. This configuration allows the spool to compensate for changes in angle of the line. It can also compensate for changes in the effective diameter of the roller as the flexible sheet is rolled up. Since only one thickness of line is wrapped around any part of the spool, it eliminates the effect of the thickness of the line on spool diameter. This simple geometry can give great flexibility over the action of the damper.

Figure 8:
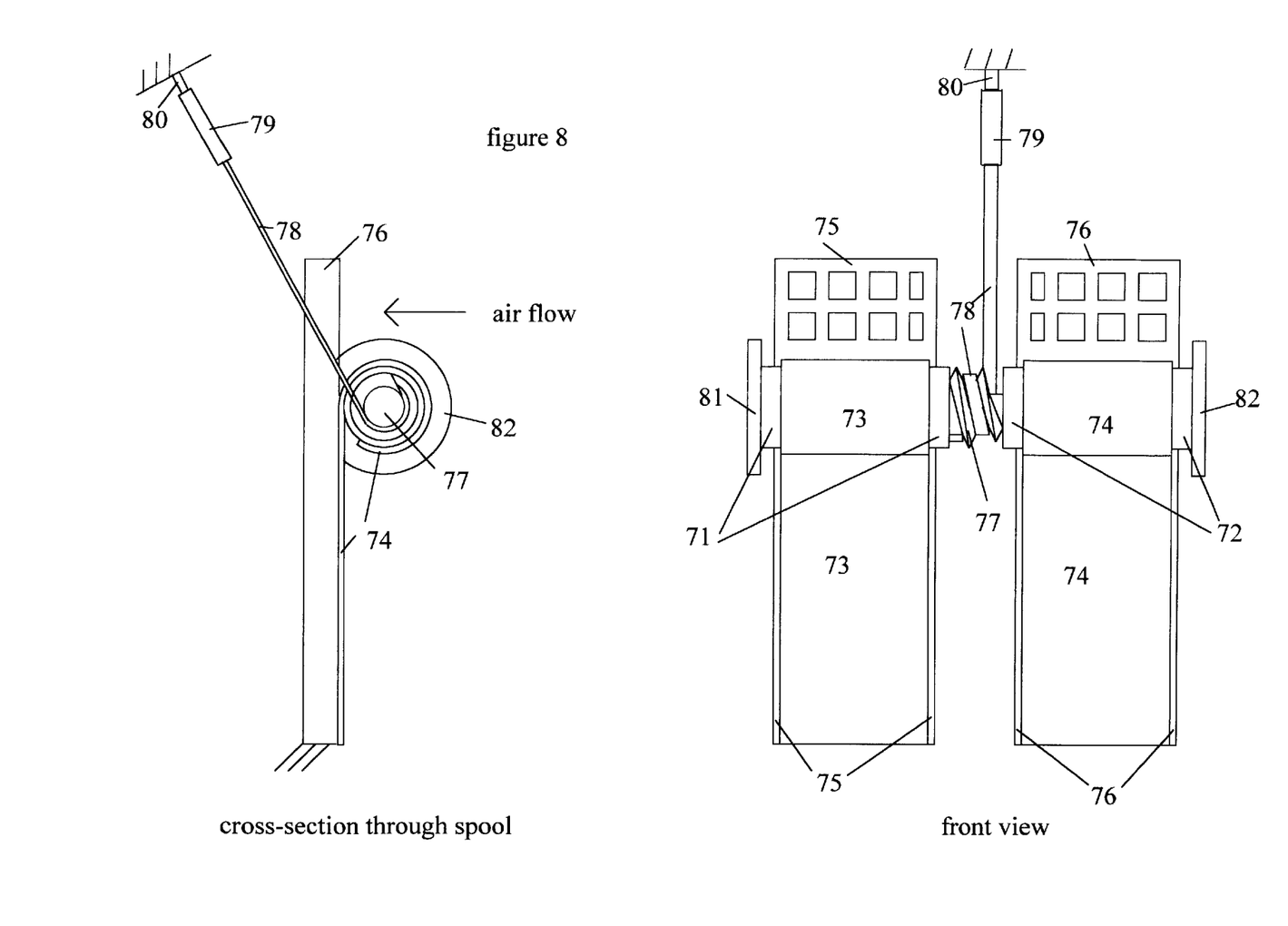
FIG. 8 is a preferred embodiment of the invention that is suitable for air flow in a horizontal direction.

FIG. 8 shows a preferred embodiment that is designed for horizontal air flow. This embodiment combines the principles described above. Rollers 71 and 72 share a common axis and are both rigidly connected to spool 77. As the rollers turn they lay sheets 73 and 74 down on rolling surfaces 75 and 76. Sheets 73 and 74 are attached at one end to the rollers. The other end of the sheets is attached to the lower edge of rolling surfaces 75 and 76. The rolling surfaces have holes that allow air flow when the sheets are removed. The sheets are preferably of a flexible magnetic material and the rolling surface is preferably made of steel or other material that is attracted to the magnetic sheet. Line 78 is attached at one end to spool 77 and at the other end to actuator 79. The line is wrapped around the spool. The line and the sheets are wrapped in opposite directions. Actuator 79 is attached to a short section of line 80 that is in turn attached to a base.

This embodiment uses gravity to control provide a return means for the rollers. When the actuator is not activated, the rollers are at the bottom of the rolling surfaces, which allows air flow through the surface. When the actuator is activated it contracts and pulls line 78. This tension force is transmitted to spool 77 and causes the rollers to move up the rolling surfaces. As the rollers move up, sheets 73 and 74 cover the rolling surface and block the air flow. The spool is similar to that shown in FIG. 7 and is made so that the effective diameter decreases as the rollers move upward. The spool is preferably designed so that force required from the actuator is approximately constant as the rollers move up. The magnetic attraction between the sheets and the surface ensure that there is a good seal. The tension from line 78 also pulls the rollers against the surface to ensure that good contact is maintained. When the actuator is turned off, the tension on line 78 is reduced and the weight of the rollers causes them to return to the bottom of the rolling surfaces.

This same basic configuration can handle several orientations. While this drawing show a vertical rolling surface, the surface could also be at an angle. In addition the action of the damper can be reversed so that damper is normally closed instead of normally open. While the preferred flow direction is to the left in FIG. 8, the magnetic attraction of the sheet to the surface can also control flow in the opposite direction so long as pressures are not excessive. here are many options for actuators. Shape-memory actuators are a good option. They can respond to heat by contracting a short distance. An electrical current flowing through the actuator or an external source of heat can activate the actuator. Similarly wax piston actuators also respond to heat and are another option. They normally act by extending a piston a short distance (less than an inch typically). Of course manual actuation is also an option.

Both the wax actuators and the shape-memory actuators can be designed to respond to temperature changes in the environment. This feature can allow the use of the actuator to open or close the damper in response to temperature changes a room or other space. This characteristic can eliminate the need for separate thermostats or control wires, which greatly simplifies the installation and control of dampers for heating or air-conditioning systems. It can also be used to automatically provide ventilation to greenhouses, barns, or other buildings.

Many other configurations are possible using these basic design principles. For example, control of the spool geometry can create a toggle action whereby the moment acting on the roller by a spring decreases after a certain position. This feature means that the actuator can turn off once roller reaches its final position. A force in the opposite direction would be necessary to return the roller to the original position.

Another option is to use two rollers that move in opposite directions. A line can attach a spool from one roller to a spool for the other roller so motions of the two rollers are tied together. A single spring and a single actuator are all that is necessary to open and close this damper. Since the rollers move in opposite directions, the effect of gravity is neutralized, which allows the damper to work in practically any orientation. Other arrangements for counterweights are also possible.

Figure 9:
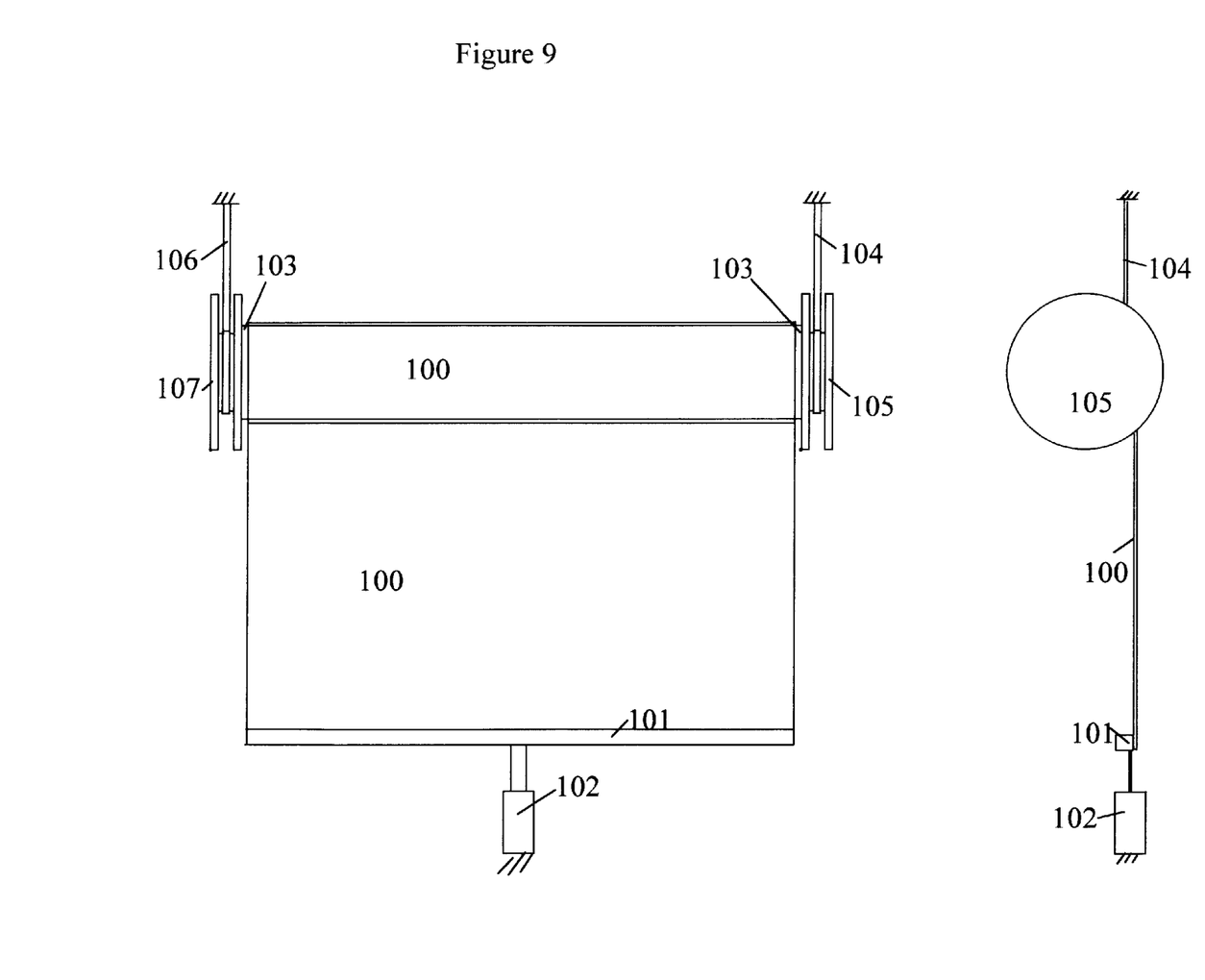
FIG. 9 is an embodiment that is suitable as a sun shade.

FIG. 9 shows an embodiment that is suitable for use as window shade. The setup is very similar to that shown in FIG. 1. Sheet 100 is wrapped around roller 103. A bar 101 is attached to the bottom of sheet 100, which serves to hold the end of the sheet and also acts as counterweight to partially offset the weight of the roller. Bar 101 is attached to an actuator 102. The roller 103 is rigidly attached to spools 105 and 107. Line 104 is wrapped around spool 105 and likewise line 106 is wrapped around spool 107. The direction of rap of the lines is opposite that of the sheet. The diameter of the spools is slightly smaller than that of the roller.

When the actuator operates it contracts to create a tension force on sheet 100, which creates a force on the roller 103 that causes it to move up and unroll sheet 100. When the actuator is off, the weight of the roller causes the roller to move back down are roll up the sheet. The result is a very simple, low-cost mechanism for providing controllable shading. The actuator can be designed to operate in response to air temperature changes or changes temperature from exposure to sunlight, so the device can be self-actuating.

Among the advantages of this invention are simplicity, low cost, great flexibility in operation, excellent sealing properties as a damper, compatibility with low-cost actuators, and the ability to work in self-actuating mode. Overall this invention represents a great advance in damper and shade design. In addition the mechanism has a wide variety of uses including as a toy or in exercise devices.

I claim:

1. A mechanism comprising:
   a first spool;
   a first flexible member that is attached at one end to said first spool and is partially wrapped around said first spool in a first angular direction and extends from said first spool in a first linear direction;
   a second spool that has a different diameter than said first spool and is rigidly connected to said first spool and shares an axis of rotation with said first spool;
   and a second flexible member that is attached at one end to said second spool and is partially wrapped around said second spool in a second angular direction that is opposite said first angular direction and extends from said second spool in a linear direction that is approximately opposite said first linear direction so that tension applied to the first and second flexible members urges the spools to rotate so as to wind the spool with the smaller diameter, unwind the spool with the larger diameter, and create a linear movement of the axis of the spools that is larger than the linear movement of the flexible members.

2. The mechanism of claim 1 further comprising:
a third spool that has the same diameter and axis of rotation as that of said second spool and is rigidly connected to the first spool on a side opposite that of said second spool
and a third flexible member that is attached at one end to said third spool and is partially wrapped around said third spool in said second angular direction and extends from said third spool in a linear direction that is approximately opposite said first linear direction so that tension on said third flexible member acts to balance forces acting to turn the axis of the spools.

3. The mechanism of claim 2 further comprising return means that moves said roller in a linear direction that is opposite from that resulting from tension applied to the first, second, and third flexible members.

4. The mechanism of claim 3 wherein said return means comprises gravity acting on the spools.

5. The mechanism of claim 3 wherein said second and third spools have a smaller diameter than said first spool and said return means comprises:
a fourth spool that has a diameter greater than that of the first spool and is rigidly connected to said second spool;
a fifth spool that is of equal diameter to said fourth spool and is rigidly connected to said third spool and shares a common axis with the first, second, and third spools;
a fourth flexible member that is attached at one end to said fourth spool and is partially wrapped around said fourth spool in said second angular direction and extends from said fourth spool in a linear direction that is approximately opposite said first linear direction;
and a fifth flexible member that is attached at one end to said fifth spool and is partially wrapped around said fifth spool in said second angular direction and extends from said fifth spool in a linear direction that is approximately opposite said first linear direction so that increasing the tension on the fourth and fifth flexible members relative to that on the second and third flexible members urges said first spool to wind while increasing the tension on the second and third flexible members relative to that of the fourth and fifth flexible members urges said first spool to unwind.

6. The mechanism of claim 3 wherein said first flexible member is a flexible sheet.

7. The mechanism of claim 6 further comprising a rolling surface that is in contact with said first spool so that said flexible sheet covers said rolling surface as the spools rotate in said first angular direction.

8. The mechanism of claim 7 wherein said flexible sheet is magnetically attracted to said rolling surface.

9. The mechanism of claim 7 wherein said rolling surface contains channels that allow passage of a fluid.

10. The mechanism of claim 9 wherein said second and third spools have a smaller diameter than said first spool and wherein said return means comprises:
a fourth spool that has a diameter greater than that of the first spool and is rigidly connected to said second spool;
a fifth that is of equal diameter to said fourth spool and is rigidly connected to said third spool and shares a common axis with the first, second, and third spools;
a fourth flexible member that is attached at one end to said fourth spool and is partially wrapped around said fourth spool in said second angular direction and extends from said fourth spool in a linear direction that is approximately opposite said first linear direction;
and a fifth flexible member that is attached at one end to said fifth spool and is partially wrapped around said fifth spool in said second angular direction and extends from said fifth spool in a linear direction that is approximately opposite said first linear direction so that increasing the tension on the fourth and fifth flexible members relative to that on the second and third flexible members urges said first spool to wind while increasing the tension on the second and third flexible members relative to that of the fourth and fifth flexible urges said first spool to unwind.

11. The mechanism of claim 3 wherein said second and third flexible members are flexible sheets.

12. The mechanism of claim 11 further comprising a rolling surface that is in contact with the second and third spools so that said flexible sheets cover said rolling surface as the spools rotate in said second angular direction.

13. The mechanism of claim 12 wherein said flexible sheets are magnetically attracted to said rolling surface.

14. The mechanism of claim 12 wherein said rolling surface contains channels that allow passage of a fluid.

15. The mechanism of claim 1 wherein said second spool has a smaller diameter than said first spool and further comprising:
a third spool that shares a common axis with the first and second spools and which has a diameter greater than that of the first spool and is rigidly connected to said first spool on a side opposite that of said second spool and
a third flexible member that is attached at one end to said third spool and is partially wrapped around said third spool in said second angular direction and extends from said third spool in a linear direction that is approximately opposite said first linear direction so that increasing tension on said third flexible member relative to that on said second flexible member urges the said first spool to wind while increasing the tension on said second flexible member relative to that of said third flexible member urges said first spool to unwind.

16. The mechanism of claim 3 wherein said first spool has an approximately helical groove that can hold said first flexible member which allows the effective radius of said first spool to be a function of the length of the portion of the first flexible member that is wrapped around said first spool.

17. The mechanism of claim 1 wherein said second spool has an approximately helical groove that can hold said second flexible member which allows the effective radius of said second spool to be a function of the length of the portion of the second flexible member that is wrapped around said second spool.

18. The mechanism of claim 17 further comprising:
a third spool that has a helical groove that is similar to that of said second spool and is rigidly connected to said first spool on a side opposite from that of said second spool
and a third flexible member that is partially wrapped around said third spool in said second angular direction.

19. A mechanism for covering and uncovering a surface with a flexible sheet using tension applied to flexible members as inputs comprising:

a rolling surface that contains channels that allow flow of fluid;

a first spool is in contact with said rolling surface;

a first flexible member that comprises a flexible sheet that is attached at one end to said first spool and is partially wrapped around said first spool in a first angular direction and extends in a first linear direction that is along said rolling surface and is magnetically attracted to said rolling surface;

a second spool that is smaller in diameter that said first spool and is rigidly connected to said first spool and shares an axis of rotation with said first spool;

a second flexible member that is attached at one end to said second spool and is partially wrapped around said second spool in a second angular direction that is opposite said first angular direction and extends from said second spool in a second linear direction that is approximately opposite the first linear direction;

a third spool that has the same diameter as the second spool and is rigidly connected to said first spool;

a third flexible member that is attached at one end to said second spool and is partially wrapped around said second spool in said second angular direction and extends from said third spool in a linear direction that is approximately opposite said first linear direction;

a fourth spool that has the same diameter that is larger than the diameter of said first spool and is rigidly connected to said second spool;

a fourth flexible member that is attached at one end to said fourth spool and is partially wrapped around said fourth spool in said second angular direction and extends from said fourth spool is a linear direction that is approximately opposite said first linear direction;

a fifth spool of equal diameter to said fourth that is rigidly connect to said third spool, and shares a common axis with the first, second, third, and fourth spools; and a fifth flexible member that is attached to at one end to said fifth spool and is partially wrapped around said fifth spool in said second angular direction and extends from said fifth spool in a linear direction that is approximately opposite said first linear direction whereby tension on the second and third flexible members urges said first spool to unwind and thereby covers said rolling surface with said flexible sheet and tension on the fourth and fifth flexible member urges said first spool to wind and thereby removes said flexible sheet from said rolling surface.

* * * * *